(12) United States Patent
Kuo et al.

(10) Patent No.: US 8,324,849 B2
(45) Date of Patent: Dec. 4, 2012

(54) MOTOR CONTROL APPARATUS AND CONTROL METHOD THEREOF

(75) Inventors: Po-Tsun Kuo, Taoyuan Hsien (TW); Wen-Chuan Ma, Taoyuan Hsien (TW); Chung-Hung Tang, Taoyuan Hsien (TW); Chun-Lung Chiu, Taoyuan-Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 581 days.

(21) Appl. No.: 12/210,070

(22) Filed: Sep. 12, 2008

(65) Prior Publication Data

US 2009/0284196 A1    Nov. 19, 2009

(30) Foreign Application Priority Data

May 15, 2008    (TW) .............................. 97117796 A

(51) Int. Cl.
    *H02P 6/08* (2006.01)
(52) U.S. Cl. .............................. 318/400.14; 318/400.12
(58) Field of Classification Search .................. 318/700, 318/400.01, 400.04, 400.07, 400.12, 400.14, 318/400.17
    See application file for complete search history.

(56) References Cited

U.S. PATENT DOCUMENTS

| | | | | |
|---|---|---|---|---|
| 4,628,475 A | * | 12/1986 | Azusawa et al. | 708/845 |
| 4,644,234 A | * | 2/1987 | Nola | 318/400.09 |
| 4,651,068 A | * | 3/1987 | Meshkat-Razavi | 318/400.02 |
| 5,463,299 A | * | 10/1995 | Futami et al. | 318/618 |
| 5,635,810 A | * | 6/1997 | Goel | 318/719 |
| 6,002,234 A | * | 12/1999 | Ohm et al. | 318/729 |
| 6,774,592 B2 | * | 8/2004 | Walters et al. | 318/400.09 |

FOREIGN PATENT DOCUMENTS

| | | |
|---|---|---|
| CN | 1972112 A | 5/2007 |
| JP | 5292782 A | 11/1993 |
| JP | 8289584 A | 11/1996 |
| JP | 2003164180 A | 6/2003 |
| JP | 2005312198 A | 11/2005 |
| JP | 2007129896 A | 5/2007 |
| JP | 2007252136 A | 9/2007 |
| WO | WO 2008018167 A1 | 2/2008 |

OTHER PUBLICATIONS

"Lectures on Variable Frequency Speed Control of AC Machines, Sinusoidal Pulse-Width Modulation (SPWM) Control", *Power Electronics*, Feb. 28, 2007, pp. 49-55.

* cited by examiner

*Primary Examiner* — Bentsu Ro
(74) *Attorney, Agent, or Firm* — Muncy, Geissler, Olds & Lowe, PLLC

(57) ABSTRACT

A motor control apparatus includes a sensing module, a phase modulating module, a duty cycle modulating module and a driving module. The sensing module detects a motor to generate a sensing signal. The phase modulating module receives the sensing signal and generates a phase modulation signal in accordance with the sensing signal. The duty cycle modulating module receives the phase modulation signal and generates a duty cycle modulation signal in accordance with the phase modulation signal. The driving module receives the duty cycle modulation signal and generates a motor control signal for controlling the motor in accordance with the duty cycle modulation signal.

18 Claims, 11 Drawing Sheets

MOTOR CONTROL APPARATUS AND CONTROL METHOD THEREOF

CROSS REFERENCE TO RELATED APPLICATIONS

This Non-provisional application claims priority under 35 U.S.C. §119(a) on Patent Application No(s). 097117796, filed in Taiwan, Republic of China on May 15, 2008, the entire contents of which are hereby incorporated by reference.

BACKGROUND OF THE INVENTION

1. Field of Invention

The present invention relates to a motor control apparatus and a control method thereof.

2. Related Art

A motor is an important device for rotating or moving an object. Moreover, the working efficiency can be enhanced by using the suitable motor. Regarding to the motor applied to a fan, the motor can drive the impeller of the fan to rotate so as to generate airflows or dissipate heats. If the motor properly functions, the heat dissipation efficiency of the fan can be maintained.

In general, a motor is constituted by a stator and a rotor disposed opposite to each other. The rotor can rotate with respect to the stator by the magnetic force and magnetic field change. The magnetic field change represents the phase commutation of the magnetic poles of the motor. The conventional motor usually utilizes a brush and a commutator to carry out the phase commutation. However, the high speed rotation of the rotator causes the serious friction between the brush and commutator, which may result in the damage of the motor. Accordingly, the electronic commutator is used to carry out the phase commutation in the present motor. The electronic commutator mainly utilizes a Hall sensor to sense the positions of the magnetic poles of the motor (or the magnetic field change) so as to determine the position of the rotor. Then, a control signal is generated to control the switch of the coil current in the stator, thereby achieving the phase commutation.

The above-mentioned method of sensing the magnetic field change by the Hall sensor is related to the rotation speed of the motor and the positions of the Hall sensor. Thus, the Hall sensor must be disposed at the optimum position so as to process the precisely sensing. In the present application, it is most commonly used way to control the rotation speed of the motor. When the rotation speed of the motor is changed, the Hall sensor can not be adjusted to the optimum position automatically, so that it may sense the leading or lagging magnetic field phase and output improper control signal. In this case, the phase commutation is not smooth and the motor may generate noise. When the motor is applied to a fan, the heat dissipation efficiency of the fan will be worse.

SUMMARY OF THE INVENTION

In view of the foregoing, the present invention is to provide a motor control apparatus and a control method thereof that can improve the motor efficiency and decrease the noise (or vibration) of the motor.

To achieve the above, the present invention discloses a motor control apparatus including a sensing module, a phase modulating module, a duty cycle modulating module and a driving module. The sensing module detects at least one status of the motor so as to generate a sensing signal. The phase modulating module receives the sensing signal and generates a phase modulation signal in accordance with the sensing signal. The duty cycle modulating module receives the phase modulation signal and generates a duty cycle modulation signal in accordance with the phase modulation signal. The driving module receives the duty cycle modulation signal and generates a rotation-speed control signal in accordance with the duty cycle modulation signal for controlling the motor.

In addition, the present invention also discloses a motor control apparatus including sensing module and a controller. The controller includes a phase modulating module, a duty cycle modulating module and a driving module. The sensing module detects at least one status of a motor so as to generate a sensing signal. The phase modulating module receives the sensing signal and generates a phase modulation signal in accordance with the sensing signal. The duty cycle modulating module receives the phase modulation signal and generates a duty cycle modulation signal in accordance with the phase modulation signal. The driving module receives the duty cycle modulation signal and generates a rotation-speed control signal in accordance with the duty cycle modulation signal for controlling the motor.

To achieve the above, the present invention further discloses a motor control method including the following steps of receiving a sensing signal, generating a phase modulation signal in accordance with the sensing signal, generating a duty cycle modulation signal in accordance with the sensing signal, and generating a rotation-speed control signal in accordance with the duty cycle modulation signal for controlling a motor.

As mentioned above, the motor control apparatus and method of the present invention utilize the phase modulating module to modulate and generate the phase modulation signal. Then, the duty cycle modulating module can generate the duty cycle modulation signal according to the phase modulation signal and then output the duty cycle modulation signal to the driving module. The driving module generates a rotation-speed control signal according to the duty cycle modulation signal for controlling the motor. Therefore, the motor efficiency can be improved and the noise (or vibration) of the motor can be decreased.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

A motor control apparatus according to the embodiment of the present invention is electrically connected to a motor and includes a sensing module, a phase modulating module, a duty cycle modulating module and a driving module. The motor can be a brushless DC motor. In the embodiment, the connections between the phase modulating module, the duty cycle modulating module and the sensing module are not limited. For example, the phase modulating module can be electrically connected to the sensing module and the duty cycle modulating module, separately. Alternatively, the duty cycle modulating module can be electrically connected to the sensing module and the phase modulating module, separately. The following description will take the first connection type for example.

First Embodiment

Figure 1:
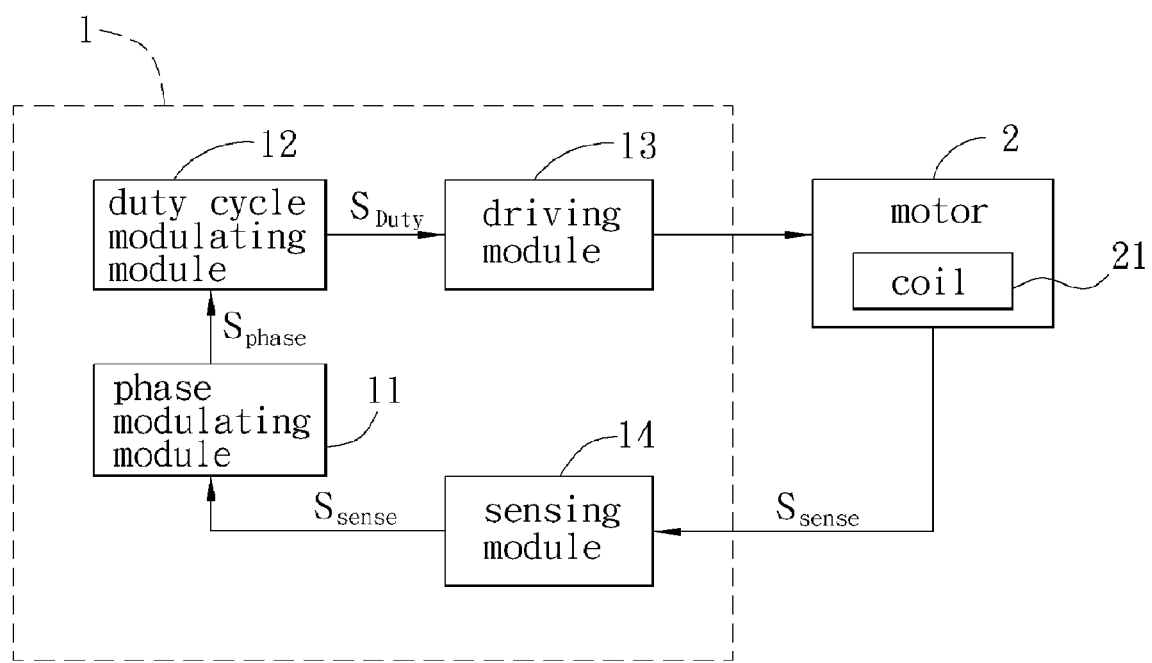
FIG. 1 is a circuit block diagram showing a motor control apparatus according to a first embodiment of the present invention.

With reference to FIG. 1, the motor control apparatus 1 according to a first embodiment of the present invention is electrically connected to a motor 2 and includes a phase modulating module 11, a duty cycle modulating module 12, a driving module 13 and a sensing module 14.

The sensing module 14 is electrically connected to the phase modulating module 11 and the motor 2 for sensing at least one status of the motor 2, such as the phase commutation status, operation current, rotation speed and/or power of the motor 2, and then generating a sensing signal $S_{sense}$, which is then transmitted to the phase modulating module 11. In the embodiment, the sensing module 14 can be a Hall sensor, which can sense the phase commutation status of the coil 21 of the motor 2 so as to generate the sensing signal $S_{sense}$. Alternatively, the sensing module 14 can be a rotation-speed sensing module, a current sensing module or a power sensing module for sensing the rotation speed, the operation current or power of the motor so as to generate the sensing signal $S_{sense}$. Accordingly, with respect to different sensing module 14, the sensing signal $S_{sense}$ can be a rotation-speed sensing signal, a current sensing signal or a power sensing signal.

The phase modulating module 11 is electrically connected to the sensing module 14 and the duty cycle modulating module 12 for receiving the sensing signal $S_{sense}$ so as to realize the phase commutation status of the motor 2. Then, the phase modulating module 11 generates a phase shifting value $Val_{phase}$ according to the sensing signal $S_{sense}$ and obtains the phase modulation signal $S_{phase}$ by calculation according to the sensing signal $S_{sense}$ and the phase shifting value $Val_{phase}$, which is then transmitted to the duty cycle modulating module 12. The phase difference (leading or lagging) between the phase modulation signal $S_{phase}$ and the sensing signal $S_{sense}$ is equal to the phase difference represented by the phase shifting value $Val_{phase}$. Thus, the phase modulating module 11 can dynamically modulate the phase shifting value $Val_{phase}$ according to the actual rotation speed of the motor 2, so that better simulation effect can be obtained by the phase modulation.

Figure 2:
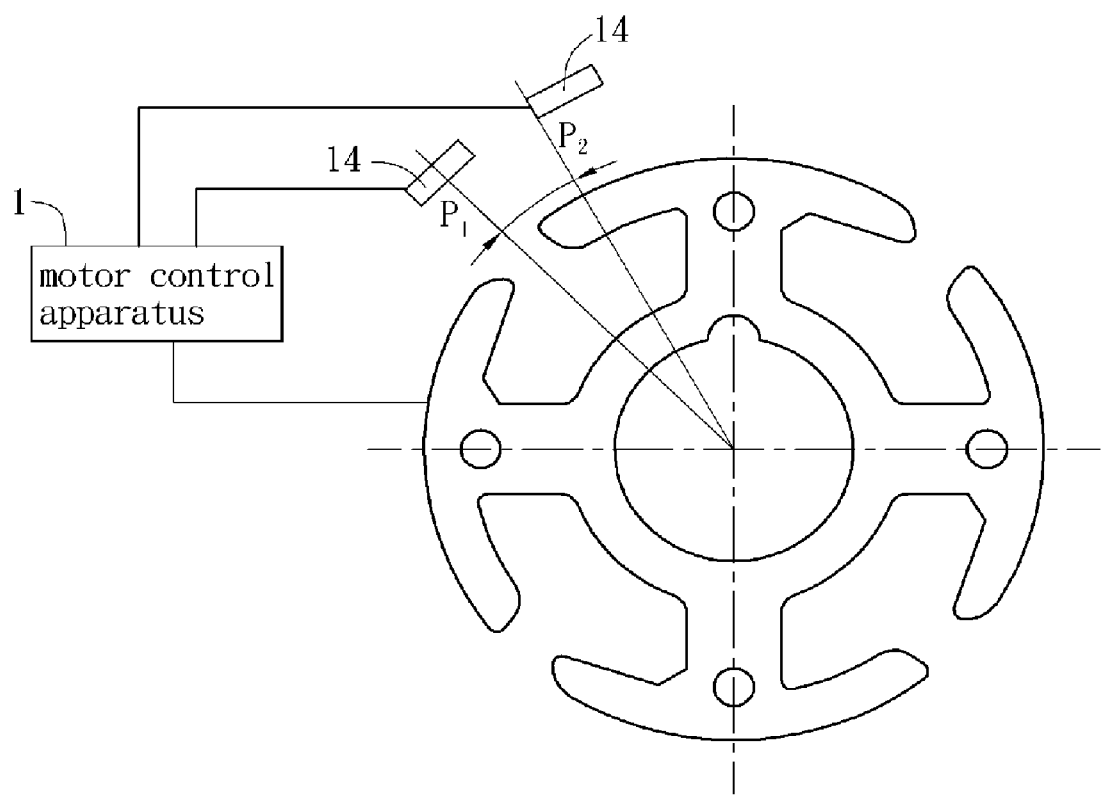
FIG. 2 is a schematic illustration showing the position of the sensing module disposed in the motor.

Moreover, the phase modulating module 11 can further include the correlation table or a correlation equation of the sensing signal $S_{sense}$ and the phase shifting value $Val_{phase}$. For example, the phase modulating module 11 can include a rotation-speed correlation table, which records various rotation speeds of the motor 2 and the correlated phase shifting values $Val_{phase}$. Accordingly, the phase modulating module 11 can estimate the phase shifting value $Val_{phase}$ according to the sensing signal $S_{sense}$ and the correlation table or the correlation equation, so that the leading or lagging of the phase of the motor 2 can be determined. The phase shifting value $Val_{phase}$ can be is an included angle between the position of the sensing module 14 in the motor 2 and the optimum sensing position corresponding to the rotation speed. For example, as shown in FIG. 2, the phase shifting value $Val_{phase}$ is a central angle between the positions $P_1$ and $P_2$.

The duty cycle modulating module 12 is electrically connected to the phase modulating module 11 and the driving module 13 for receiving the phase modulation signal $S_{phase}$. The duty cycle modulating module 12 includes a reference signal S. After receiving the phase modulation signal $S_{phase}$, the duty cycle modulating module 12 compares the reference signal and the phase modulation signal $S_{phase}$ so as to generate a duty cycle modulation signal $S_{Duty}$, which is then transmitted to the driving module 13.

Figure 3:
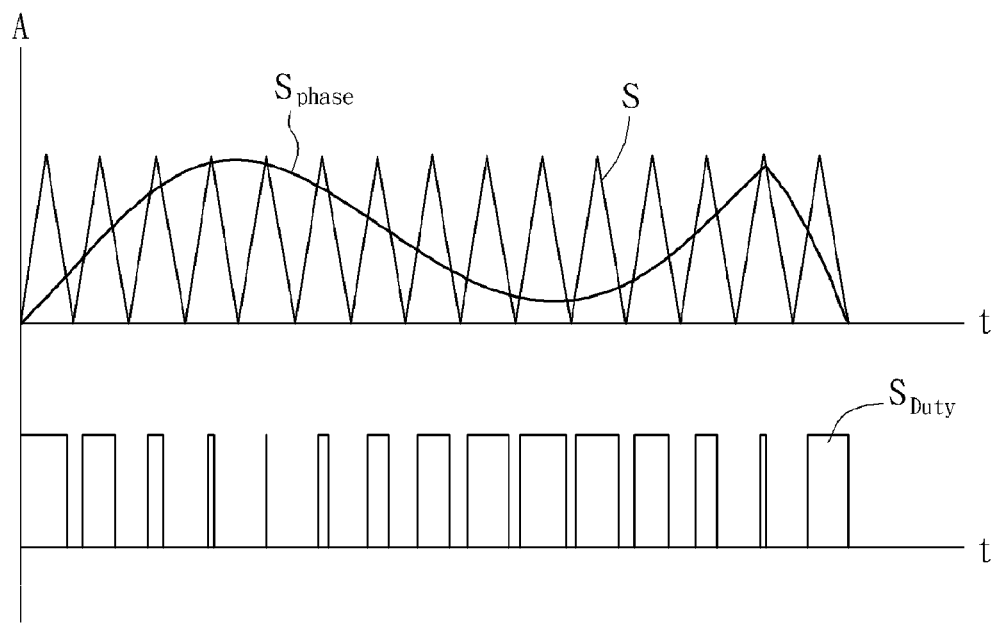
FIG. 3 is a schematic illustration showing the waveform of the duty cycle modulation signal generated by the motor control apparatus of FIG. 1.

The comparison of the reference signal S and the phase modulation signal $S_{phase}$ is shown in FIG. 3. Wherein, the vertical coordinate A represents the amplitude of the waveform, which has the unit of voltage. To be noted, since the voltage, current and power have the direct proportion relationship, the vertical coordinates of the other embodiments can be current or power. The horizontal coordinate t represents time. As shown in FIG. 3, the reference signal S is composed of a plurality of continuous and regular triangle waves. Of course, the reference signal S can be composed of, for example but not limited to, a plurality of regular trapezoid waves, sine waves or polygonal waves. Otherwise, the reference signal can also be determined according to the need of the designer.

After comparing the reference signal S and the phase modulation signal $S_{phase}$, the duty cycle modulation signal $S_{Duty}$ can be obtained. If the value of the reference signal S is larger than the value of the phase modulation signal $S_{phase}$, a high level signal will be output. If the value of the reference signal S is smaller than the value of the phase modulation signal $S_{phase}$, a low level signal will be output. Accordingly, the above-mentioned duty cycle modulation signal $S_{Duty}$ can be generated. The duty cycle modulation signal $S_{Duty}$ is composed of a plurality of square waves. Within a phase range, the width of the square wave, which is corresponding to a portion of the phase modulation signal $S_{phase}$ having smaller amplitude (the concave portion), is larger, and the width of the square wave, which is corresponding to another portion of the phase modulation signal $S_{phase}$ having larger amplitude (the convex portion), is smaller. In addition, the width of the square wave changes according to the size of the amplitude.

Figure 4:
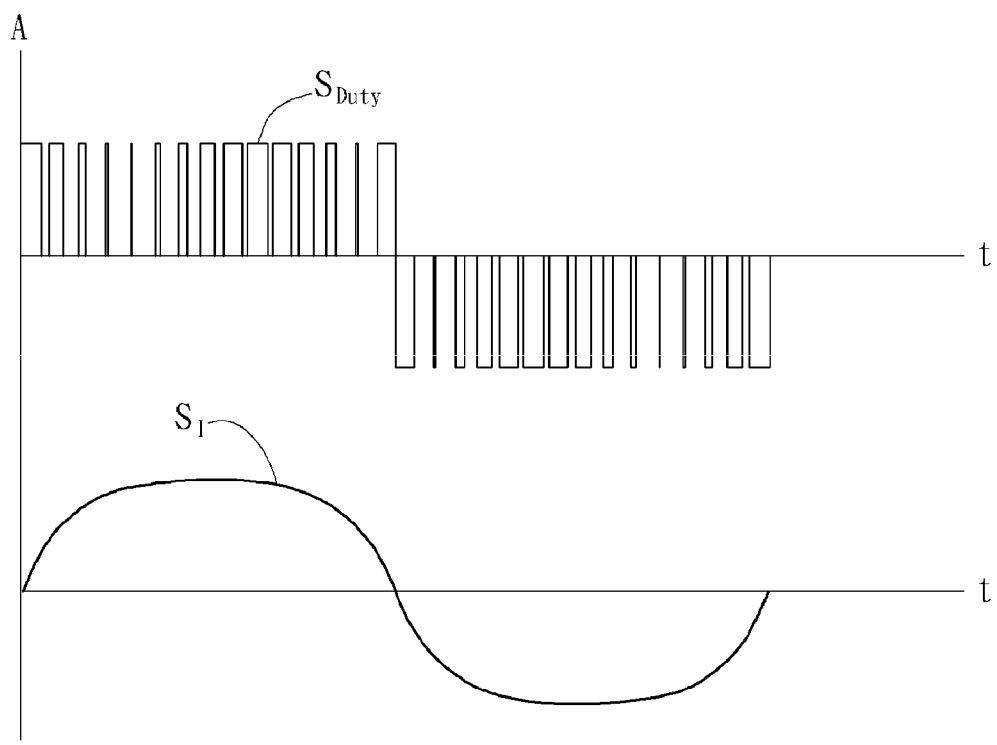
FIG. 4 is a schematic illustration showing the waveform of the measured motor current equivalent to the duty cycle modulation signal of the motor control apparatus of FIG. 1.

The driving module 13 receives the above-mentioned duty cycle modulation signal $S_{Duty}$ and generates a rotation-speed control signal according to the duty cycle modulation signal $S_{Duty}$. Then, the rotation-speed control signal is output to the motor 2 for controlling the motor 2 to have better performance. The waveform $S_1$ of the measured current of the motor 2 is shown in FIG. 4.

In embodiment, the sensing module 14 is disposed at a fixed position in advance. When the rotation speed of the motor 2 changes, the preferred sensing position of the motor 2 is changed accordingly. Although the sensing module 14 is still located at the fixed position, the sensing module 14 can simulate to sense the motor2 at the preferred sensing position after the phase modulating module 11 properly modulates the sensing signal $S_{sense}$ to the phase modulation signal $S_{phase}$ (as shown in FIG. 4). The phase difference between the sensing signal $S_{sense}$ and the phase modulation signal $S_{phase}$ is to simulate the position of the sensing module 14 in the motor with respect to the rotation speed, such as the position $P_1$ or $P_2$ of FIG. 2.

Figure 5A:
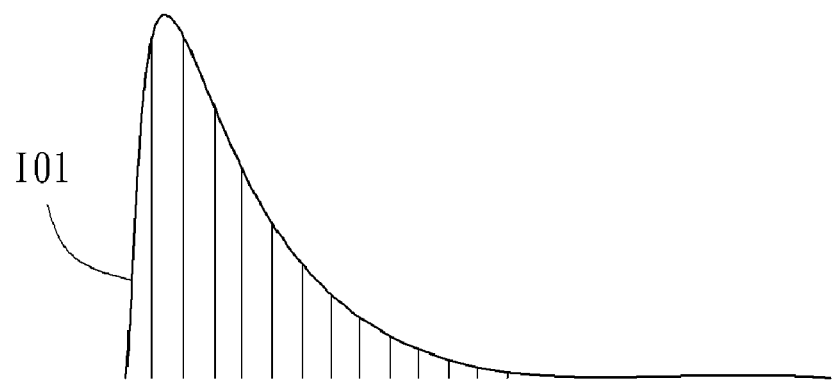
FIGS. 5A to 8C are schematic illustrations showing the waveforms of the measured motor currents of the motor control apparatus of FIG. 1.
Figure 5B:
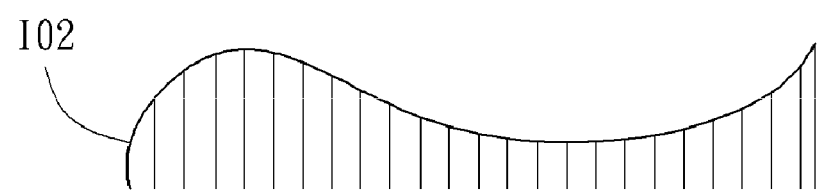
Figure 6A:
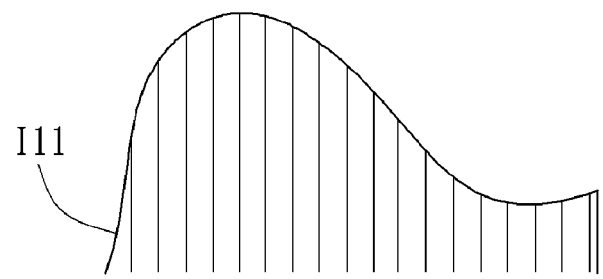
Figure 6B:
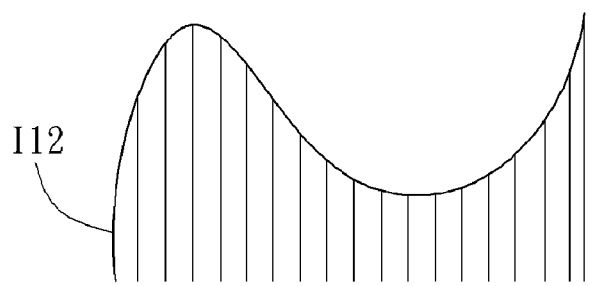
Figure 7A:
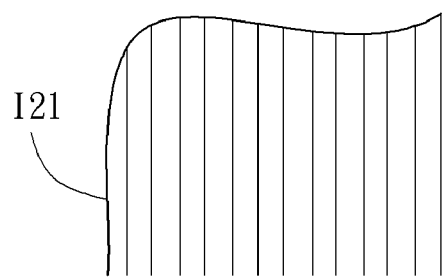
Figure 7B:
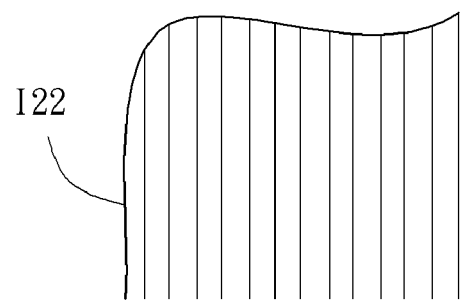
Figure 8A:
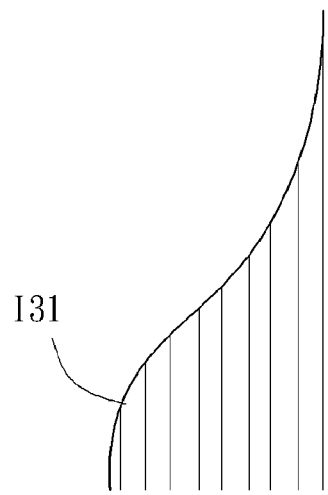
Figure 8B:
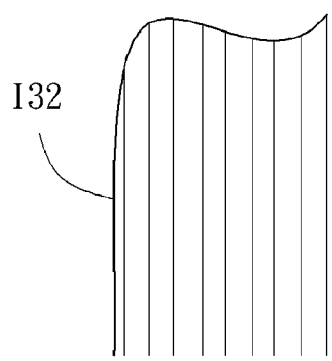

FIGS. 5A, 6A, 7A and 8A are schematic illustrations showing the waveforms of the non-modulated currents of the motor 2 under different rotation speeds. FIG. 5A shows the current waveform 101 of the motor 2 under the low rotation speed. FIG. 6A shows the current waveform 111 of the motor 2 under the middle rotation speed. FIG. 7A shows the current waveform 121 of the motor 2 under the full rotation speed. FIG. 8A shows the current waveform 131 of the motor 2 under the higher rotation speed. FIGS. 5B, 6B, 7B and 8B are schematic illustrations showing the current waveforms of the motor 2 under different rotation speeds while the sensing signal $S_{sense}$ is modulated by the phase modulating module 11. FIG. 5B shows the current waveform 102 of the motor 2 under the low rotation speed. FIG. 6B shows the current waveform 112 of the motor 2 under the middle rotation speed. FIG. 7B shows the current waveform 122 of the motor 2 under the full rotation speed. FIG. 8B shows the current waveform 132 of the motor 2 under the higher rotation speed.

The comparison between the current waveforms before and after the phase modulation will be described herein below with reference to FIGS. 5A and 5B. Compared with the current waveform 101 of FIG. 5A, the current waveform 102 of FIG. 5B has smaller average current and lower maximum current. The average current affects the performance of the motor 2 and the maximum current affects the noise generated by the motor 2, so that the motor control apparatus 1 of the embodiment can decrease the noise of the motor 2 and improve the performance of the motor 2. In addition, as shown in FIGS. 6B, 7B and 8B, the noise can be decreased and the performance of the motor 2 can be improved under the middle rotation speed, full rotation speed and higher rotation speed.

Figure 5C:
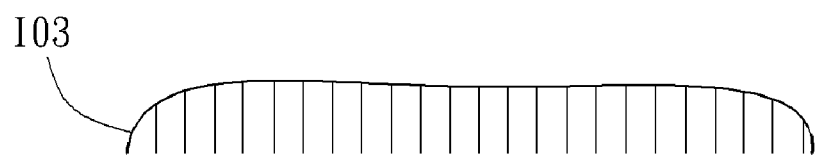
Figure 6C:
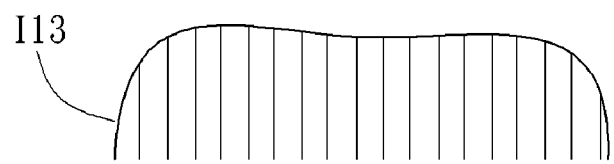
Figure 7C:
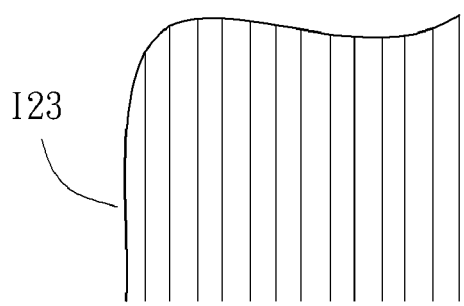
Figure 8C:
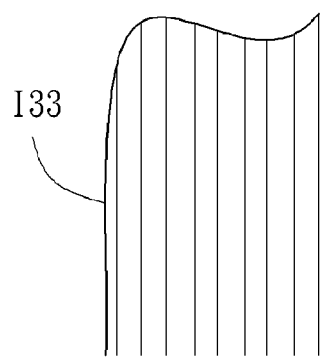

FIGS. 5C, 6C, 7C and 8C are schematic illustrations showing the current waveforms of the motor 2 under different rotation speeds while the sensing signal $S_{sense}$ is modulated by the phase modulating module 11 and the duty cycle modulating module 12. FIG. 5C shows the current waveform 103 of the motor 2 under the low rotation speed. FIG. 6C shows the current waveform 113 of the motor 2 under the middle rotation speed. FIG. 7C shows the current waveform 123 of the motor 2 under the full rotation speed. FIG. 8C shows the current waveform 133 of the motor 2 under the higher rotation speed. The comparison between the current waveforms before and after the phase modulation and duty cycle modulation will be described herein below with reference to FIGS. 5B and 5C. Compared with the current waveform 102 of FIG. 5B, the current waveform 103 of FIG. 5C has smaller average current and is less fluctuation. Thus, the motor control apparatus 1 of the embodiment can decrease the noise of the motor 2 and improve the performance of the motor 2. In addition, as shown in FIGS. 6C, 7C and 8C, the noise can be decreased and the performance of the motor 2 can be improved under the middle rotation speed, full rotation speed and higher rotation speed.

Second Embodiment

Figure 9:
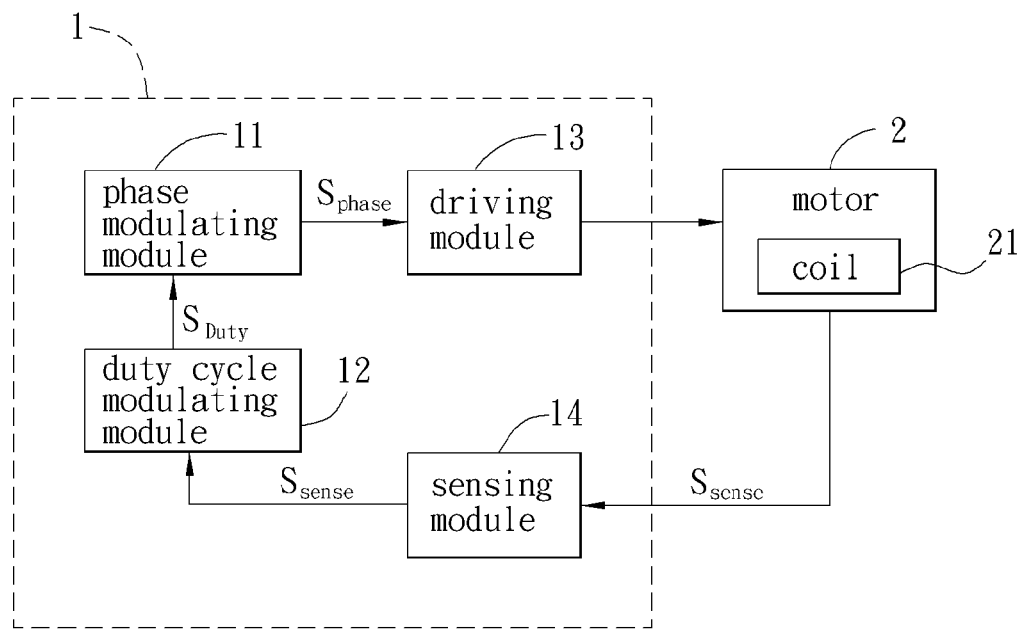
FIG. 9 is a circuit block diagram showing a motor control apparatus according to a second embodiment of the present invention.

The following description will take the second connection type for example with reference to FIG. 9. In this embodiment, the duty cycle modulating module 12 is electrically connected to the sensing module 14 and the phase modulating module 11, separately. The sensing module 14 is electrically connected to the motor 2 and the duty cycle modulating module 12 for sensing at least one status of the motor 2 so as to generate a sensing signal $S_{sense}$, which is then transmitted to the duty cycle modulating module 12. The duty cycle modulating module is electrically connected to the sensing module 14 and the phase modulating module 11 for receiving the sensing signal $S_{sense}$ and generating a duty cycle modulation signal $S_{Duty}$ in accordance with the sensing signal $S_{sense}$. The duty cycle modulation signal $S_{Duty}$ is then transmitted to the phase modulating module 11. The phase modulating module 11 is electrically connected to the duty cycle modulating module 12 and the driving module 13 for receiving the duty cycle modulation signal $S_{Duty}$ and generating a phase modulation signal $S_{phase}$ in accordance with the duty cycle modulation signal $S_{Duty}$. The phase modulation signal $S_{phase}$ is then transmitted to the driving module 13. The driving module 13 is electrically connected to the phase modulating module 11 and the motor 2 for receiving the phase modulation signal $S_{phase}$ and generating a rotation-speed control signal in accordance with the phase modulation signal $S_{phase}$. Then, the rotation-speed control signal is output to the motor 2 for controlling the motor 2. The features and functions of the phase modulating module 11 and the duty cycle modulating module 12 of the second embodiment are discussed in the first embodiment, so the detailed description thereof will be omitted.

Third Embodiment

Figure 10:
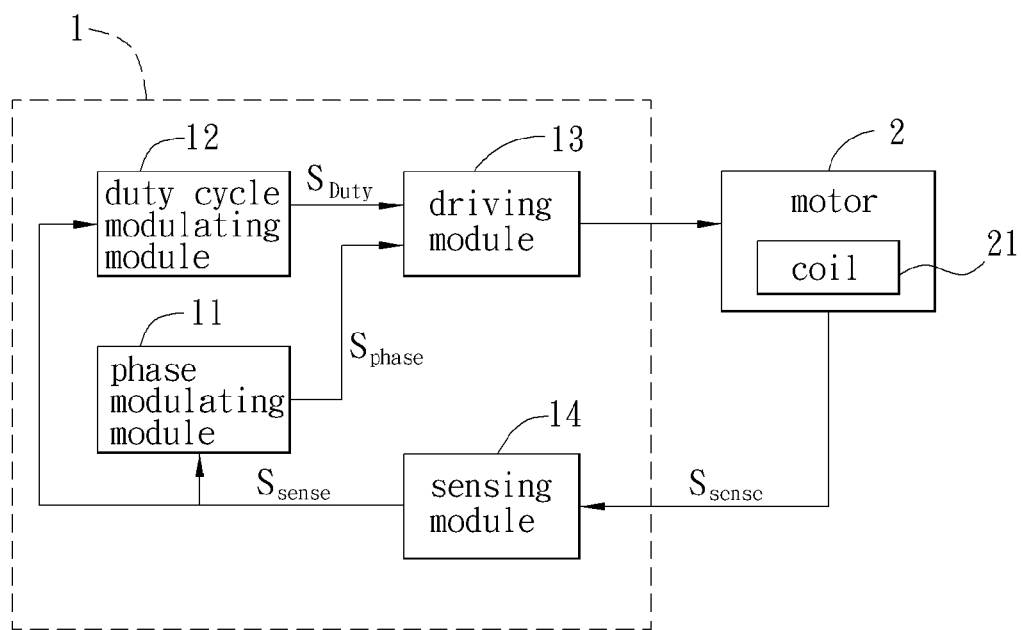
FIG. 10 is a circuit block diagram showing a motor control apparatus according to a third embodiment of the present invention.

With reference to FIG. 10, the motor control apparatus 1 according to a third embodiment is electrically connected to a motor 2 and includes a phase modulating module 11, a duty cycle modulating module 12, a driving module 13 and a sensing module 14.

The sensing module 14 is electrically connected to the motor 2, the phase modulating module 11 and the duty cycle modulating module 12 for sensing at least one status of the motor 2 so as to generate a sensing signal $S_{sense}$, which is then transmitted to the phase modulating module 11 and the duty cycle modulating module 12. The duty cycle modulating module is electrically connected to the sensing module 14 and the driving module 13 for receiving the sensing signal $S_{sense}$ and generating a duty cycle modulation signal $S_{Duty}$ in accordance with the sensing signal $S_{sense}$. The duty cycle modulation signal $S_{Duty}$ is then transmitted to the driving module 13. The phase modulating module 11 is electrically connected to the sensing module 14 and the driving module 13 for receiving the sensing signal $S_{sense}$ and generating a phase modulation signal $S_{phase}$ in accordance with the sensing signal $S_{sense}$. The phase modulation signal $S_{phase}$ is then transmitted to the driving module 13. The driving module 13 is electrically connected to the phase modulating module 11, the duty cycle modulating module 12 and the motor 2 for receiving the phase modulation signal $S_{phase}$ and the duty cycle modulation signal $S_{Duty}$, and generating a rotation-speed control signal in accordance with the phase modulation signal $S_{phase}$ and the duty cycle modulation signal $S_{Duty}$. Then, the rotation-speed control signal is output to the motor 2 for controlling the motor 2. The features and functions of the phase modulating module 11 and the duty cycle modulating module 12 of the third embodiment are discussed in the first embodiment, so the detailed description thereof will be omitted.

Fourth Embodiment

Figure 11:
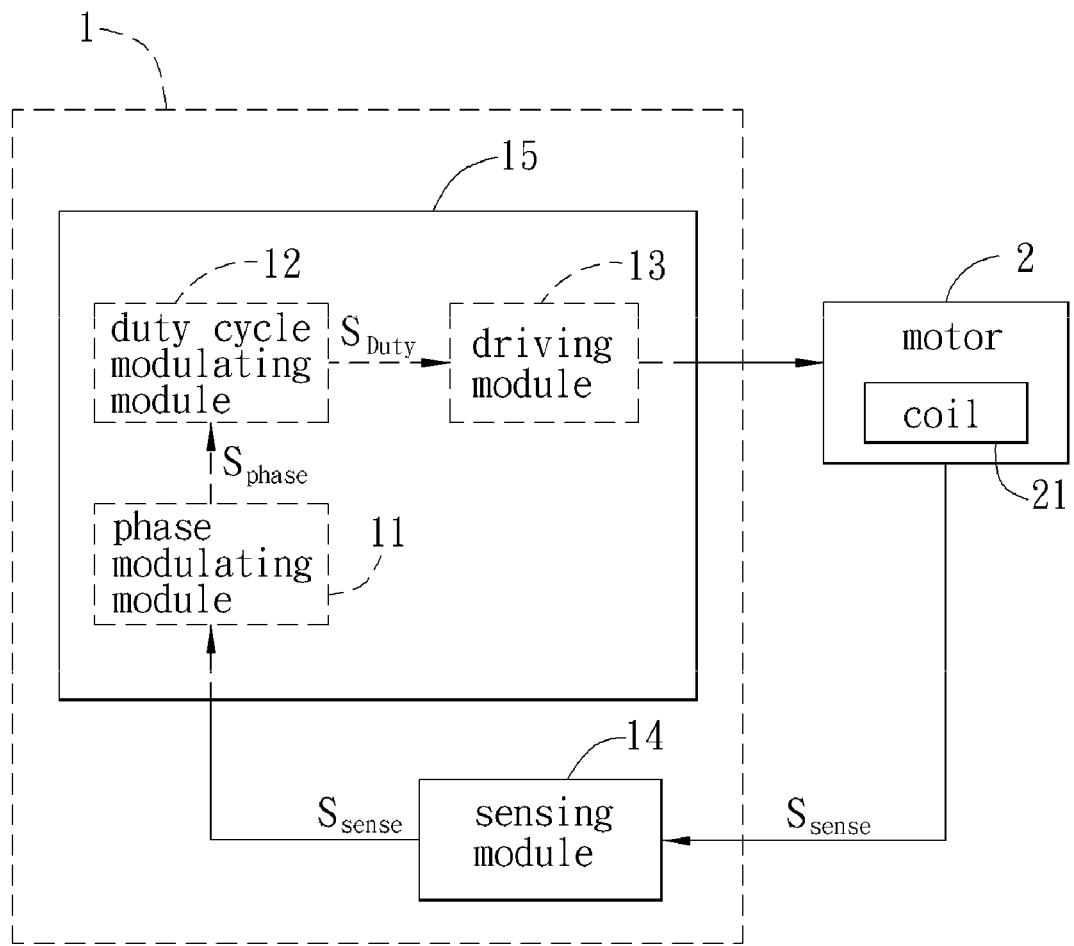
FIG. 11 is a circuit block diagram showing a motor control apparatus according to a fourth embodiment of the present invention.

FIG. 11 is a circuit block diagram showing a motor control apparatus according to a fourth embodiment of the present invention. In the fourth embodiment, the phase modulating module 11, the duty cycle modulating module 12 and the driving module 13 are integrated in a controller 15, which can calculate the phase shifting value $Val_{phase}$ by digital calculation. The controller 15 can be a programmable chip, an integrated circuit (IC), a processor, a digital signal processor (DSP) or a microprocessor. The phase modulating module 11, the duty cycle modulating module 12 and the driving module 13 can be firmware code. The features and functions of the phase modulating module 11 and the duty cycle modulating module 12 of the fourth embodiment are discussed in the first embodiment, so the detailed description thereof will be omitted.

In addition, the connections between the sensing module 14, the phase modulating module 11, the duty cycle modulating module 12 and the driving module 13 are not limited. For example, their connections can be any one of the previously mentioned first, second and third embodiments.

Fifth Embodiment

Figure 12:
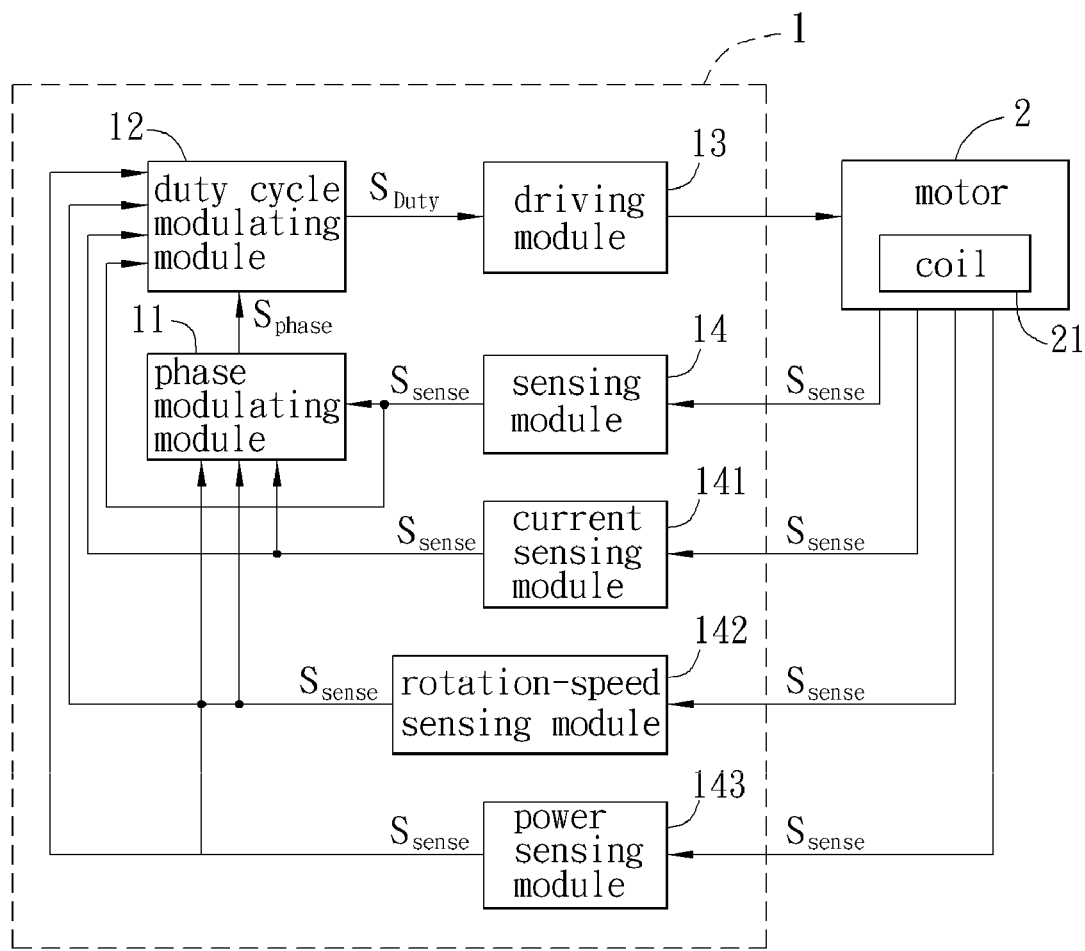
FIG. 12 is a circuit block diagram showing a motor control apparatus according to a fifth embodiment of the present invention.

FIG. 12 is a circuit block diagram showing a motor control apparatus according to a fifth embodiment of the present invention. Compared with the first embodiment, the motor control apparatus of the fifth embodiment further includes a current sensing module 141, a rotation-speed sensing module 142 and/or a power sensing module 143. The phase modulating module 11 can also verify whether the phase shifting value $Val_{phase}$ actually responds the rotation speed of the motor by the current sensing signal, the rotation-speed sensing signal and/or the power sensing signal, so that the phase modulating module 11 can generate the phase modulation signal $S_{phase}$ at the correct phase. In addition, the phase modulating module 11 can also estimate the rotation speed of the motor 2 according to the sensing signal $S_{sense}$, current sensing signal, rotation-speed sensing signal or power sensing signal. Then, the phase shifting value $Val_{phase}$ can be obtained by looking up the corresponding rotation speed, current or power in the rotation-speed correlation table, current correlation table or power correlation table, thereby generating the phase modulating signal $S_{phase}$ at the correct phase.

Figure 13:
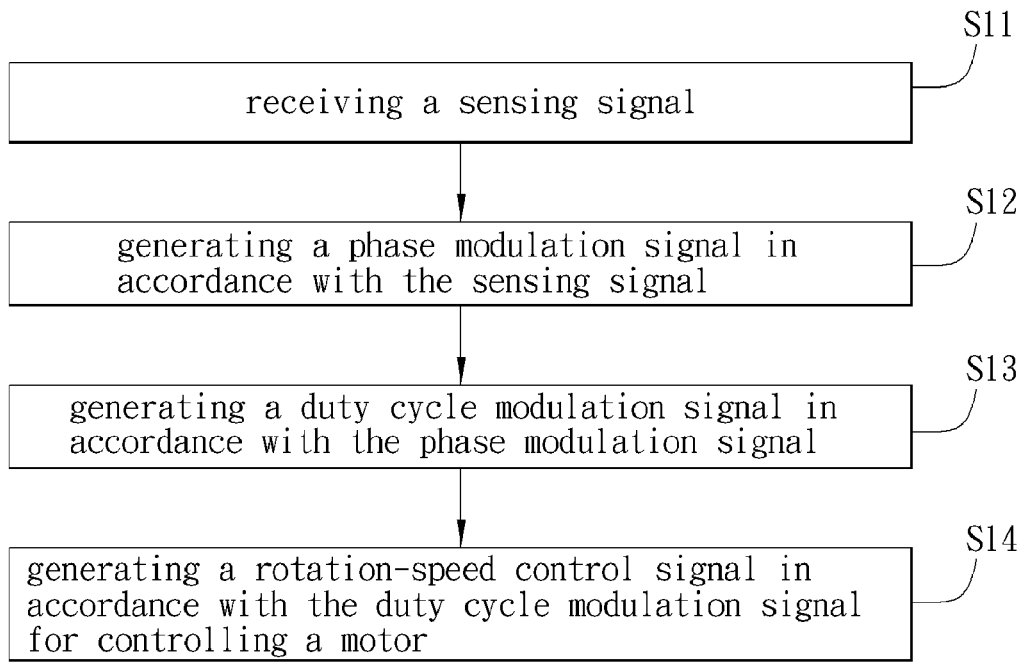
FIG. 13 is a flow chart of a motor control method according to an embodiment of the present invention.

FIG. 13 is a flow chart of a motor control method according to an embodiment of the present invention, which is applied to the above-mentioned motor control apparatus of FIG. 1. The motor control method of the present embodiment includes the following steps S11 to S14.

In the step S11, the phase modulating module 11 receives a sensing signal $S_{sense}$. In the step S12, the phase modulating module 11 generates a phase modulation signal $S_{phase}$ in accordance with the sensing signal $S_{sense}$, and the phase modulation signal $S_{phase}$ is then transmitted to the duty cycle modulating module 12. In the step S13, the duty cycle modulating module 12 generates a duty cycle modulation signal $S_{Duty}$ in accordance with the phase modulation signal $S_{phase}$, and the duty cycle modulation signal $S_{Duty}$ is then transmitted to the driving module 13. In the step S14, the driving module 13 generates a rotation-speed control signal in accordance with the duty cycle modulation signal $S_{Duty}$ for controlling a motor 2.

To be noted, the order of the steps S12 and S13 are not limited, and they can be switched. For example, the duty cycle modulation signal $S_{Duty}$ can be generated in accordance with the sensing signal $S_{sense}$. Then, the phase modulation signal $S_{phase}$ is generated in accordance with the duty cycle modulation signal $S_{Duty}$. After that, the rotation-speed control signal can be generated in accordance with the phase modulation signal $S_{phase}$ for controlling the motor 2. The control procedure has been described in the previous embodiments, so the detailed description will be omitted.

Figure 14:
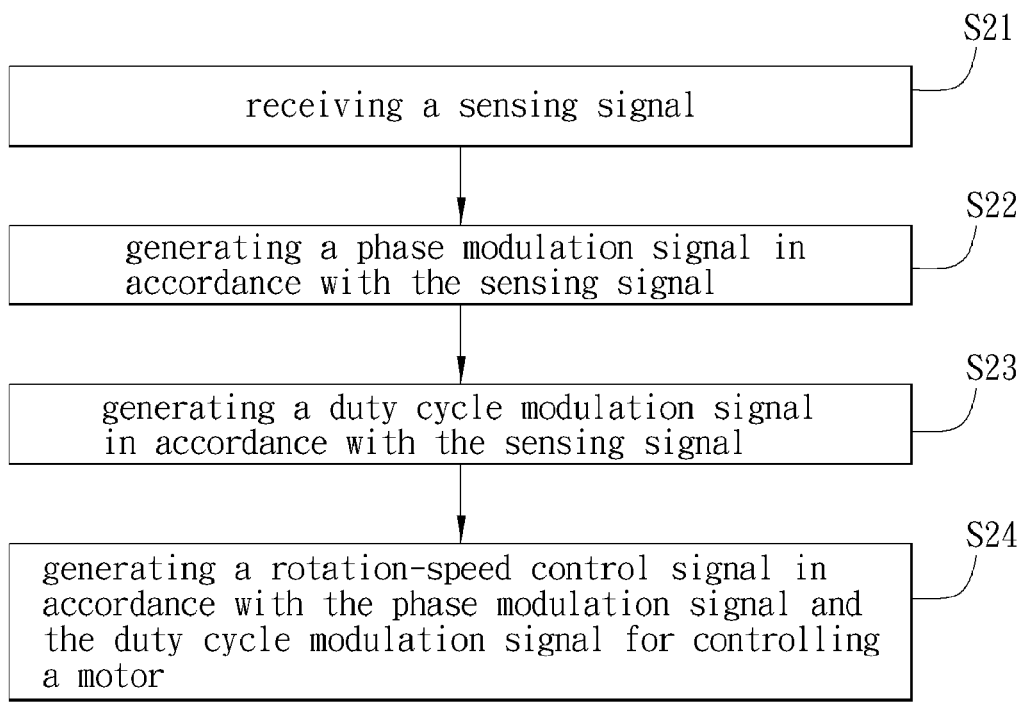
FIG. 14 is a flow chart of a motor control method according to another embodiment of the present invention.

FIG. 14 is a flow chart of a motor control method according to another embodiment of the present invention, which is applied to the above-mentioned motor control apparatus according to the third embodiment (see FIG. 10). The motor control method of the present embodiment includes the following steps S21 to S24.

In the step S21, the phase modulating module 11 and the duty cycle modulating module 12 respectively receives a sensing signal $S_{sense}$. In the step S22, the phase modulating module 11 generates a phase modulation signal $S_{phase}$ in accordance with the sensing signal $S_{sense}$, and the phase modulation signal $S_{phase}$ is then transmitted to the driving module 13. In the step S23, the duty cycle modulating module 12 generates a duty cycle modulation signal $S_{Duty}$ in accordance with the sensing signal $S_{sense}$, and the duty cycle modulation signal $S_{Duty}$ is then transmitted to the driving module 13. In the step S24, the driving module 13 generates a rotation-speed control signal in accordance with the phase modulation signal $S_{phase}$ and the duty cycle modulation signal $S_{Duty}$ for controlling a motor 2. To be noted, the order of the steps S22 and S23 are not limited.

In summary, the motor control apparatus and method of the present invention utilize the phase modulating module to modulate and generate the phase modulation signal. Then, the duty cycle modulating module can generate the duty cycle modulation signal according to the phase modulation signal and then output the duty cycle modulation signal to the driving module. The driving module generates a rotation-speed control signal according to the duty cycle modulation signal for controlling the motor. Therefore, the average current and the maximum current of the motor can be decreased, and the duty cycle of the control signal for the motor phase commutation can be controlled. Accordingly, the motor efficiency can be improved and the noise of the motor can be decreased.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control apparatus, electrically connected to a motor, the motor control apparatus comprising:
    a current sensing module detecting at least one status of the motor so as to generate a current sensing signal;
    a phase modulating module electrically connected to the current sensing module for receiving the current sensing signal and generating a phase modulation signal in accordance with the current sensing signal;
    a duty cycle modulating module electrically connected to the phase modulating module for receiving the phase modulation signal and generating a duty cycle modulation signal in accordance with the phase modulation signal; and a driving module electrically connected to the duty cycle modulating module and the motor for receiving the duty cycle modulation signal and generating a rotation-speed control signal in accordance with the duty cycle modulation signal, wherein the rotation-speed control signal is output to the motor, wherein the phase modulating module generates a phase shifting value according to the current sensing signal, and then obtains the phase modulation signal by calculation according to the current sensing signal and the phase shifting value, a phase difference between the phase modulation signal and the current sensing signal is equal to a phase difference represented by the phase shifting value, and the phase modulating module verifies whether the phase shifting value actually responds the rotation speed of the motor by the current sensing module.

2. The motor control apparatus according to claim 1, wherein the phase modulating module generates a phase shifting value according to the current sensing signal, and then obtains the phase modulation signal by calculation according to the current sensing signal and the phase shifting value, a phase difference between the phase modulation signal and the current sensing signal is equal to a phase difference represented by the phase shifting value, and the phase shifting value is a central angle between a position of the sensing module in the motor and an optimum sensing position corresponding to a rotation speed of the motor.

3. The motor control apparatus according to claim 2, wherein the phase modulating module verifies whether the phase shifting value actually responds the rotation speed of the motor by the current sensing module, so that the phase modulating module generates the phase modulation signal at the correct phase.

4. The motor control apparatus according to claim 2, wherein the phase modulating module comprises a correlation table or a correlation equation of the current sensing signal and the phase shifting value, and estimates the phase shifting value according to the current sensing signal and the correlation table or the correlation equation, and the correlation table or the correlation equation is regarding to a current versus the phase shifting value.

5. The motor control apparatus according to claim 1, wherein the duty cycle modulating module comprises a reference signal and compares the phase modulation signal and the reference signal to generate the duty cycle modulation signal, the reference signal comprises a plurality of continuous and regular triangle waves, trapezoid waves, sine waves or polygonal waves, the duty cycle modulation signal comprises a plurality of square waves, within a phase range, the width of one of the square waves, which is corresponding to a portion of the phase modulation signal having smaller amplitude, is larger than the width of another of the square waves, which is corresponding to another portion of the phase modulation signal having larger amplitude, and the width of the square wave changes according to the size of the amplitude.

6. A motor control apparatus, electrically connected to a motor, the motor control apparatus comprising:
a current sensing module detecting at least one status of the motor so as to generate a current sensing signal;
a phase modulating module electrically connected to the current sensing module for receiving the sensing signal and generating a phase modulation signal in accordance with the current sensing signal;
a duty cycle modulating module electrically connected to the current sensing module for receiving the current sensing signal and generating a duty cycle modulation signal in accordance with the current sensing signal; and
a driving module electrically connected to the phase modulating module, the duty cycle modulating module and the motor for receiving the phase modulation signal and the duty cycle modulation signal and generating a rotation-speed control signal in accordance with the phase modulation signal and the duty cycle modulation signal, wherein the rotation-speed control signal is output to the motor, wherein the phase modulating module generates a phase shifting value according to the current sensing signal, and then obtains the phase modulation signal by calculation according to the current sensing signal and the phase shifting value, a phase difference between the phase modulation signal and the current sensing signal is equal to a phase difference represented by the phase shifting value, and the phase modulating module verifies whether the phase shifting value actually responds the rotation speed of the motor by the current sensing module.

7. The motor control apparatus according to claim 6, wherein the phase modulating module generates a phase shifting value according to the current sensing signal, and then obtains the phase modulation signal by calculation according to the current sensing signal and the phase shifting value, a phase difference between the phase modulation signal and the current sensing signal is equal to a phase difference represented by the phase shifting value, and the phase shifting value is a central angle between a position of the sensing module in the motor and an optimum sensing position corresponding to a rotation speed of the motor.

8. The motor control apparatus according to claim 7, wherein the phase modulating module verifies whether the phase shifting value actually responds the rotation speed of the motor by the current sensing module, so that the phase modulating module generates the phase modulation signal at the correct phase.

9. The motor control apparatus according to claim 7, wherein the phase modulating module comprises a correlation table or a correlation equation of the current sensing signal and the phase shifting value, and estimates the phase shifting value according to the current sensing signal and the correlation table or the correlation equation, and the correlation table or the correlation equation is regarding to a current versus the phase shifting value.

10. The motor control apparatus according to claim 6, wherein the phase modulating module, the duty cycle modulating module and the driving module are integrated in a controller, the controller is a programmable chip, an integrated circuit, a processor, a digital signal processor or a microprocessor, and the phase modulating module, the duty cycle modulating module and the driving module are firmware code.

11. A motor control method, comprising steps of
receiving a current sensing signal;
generating a phase modulation signal in accordance with the current sensing signal;
generating a duty cycle modulation signal in accordance with the phase modulation signal;
estimating a phase shifting value according to the current sensing signal and a correlation table or a correlation equation of the current sensing signal and the phase shifting value, wherein the correlation table or the correlation equation is regarding to a current versus the phase shifting value;

calculating the phase modulation signal according to the current sensing signal and the phase shifting value; and generating a rotation-speed control signal in accordance with the duty cycle modulation signal for controlling a motor.

12. The motor control method according to claim 11, wherein the current sensing signal is retrieved by a current sensing module.

13. The motor control method according to claim 11, further comprising a step of:

verifying whether the phase shifting value actually responds the rotation speed of the motor according to a current sensing signal, so that the phase modulating module generates the phase modulation signal at the correct phase.

14. The motor control method according to claim 11, further comprising a step of:

comparing the phase modulation signal and a reference signal to generate the duty cycle modulation signal.

15. A motor control apparatus electrically connected to a motor, comprising:

a sensing module detecting at least one status of the motor so as to generate a sensing signal;

a phase modulating module electrically connected to the sensing module for receiving the sensing signal and generating a phase modulation signal in accordance with the sensing signal;

a duty cycle modulating module electrically connected to the phase modulating module for receiving the phase modulation signal and generating a duty cycle modulation signal in accordance with the phase modulation signal; and a driving module electrically connected to the duty cycle modulating module and the motor for receiving the duty cycle modulation signal and generating a rotation-speed control signal to be output to the motor in accordance with the duty cycle modulation signal, wherein the phase modulating module, the duty cycle modulating module and the driving module are integrated in a controller for calculating the phase shifting value by digital calculation.

16. The motor control apparatus according to claim 15, wherein the controller is a programmable chip, an integrated circuit (IC), a processor, a digital signal processor (DSP) or a microprocessor, and the phase modulating module, the duty cycle modulating module and the driving module are firmware codes.

17. A motor control apparatus electrically connected to a motor, comprising:

a sensing module detecting at least one status of the motor so as to generate a sensing signal;

a duty cycle modulating module electrically connected to the sensing module for receiving the sensing signal and generating a duty cycle modulation signal in accordance with the sensing signal;

a phase modulating module electrically connected to the duty cycle modulating module for receiving the duty cycle modulation signal and generating a phase modulation signal in accordance with the duty cycle modulation signal;

a driving module electrically connected to the phase modulating module and the motor for receiving the phase modulation signal and generating a rotation-speed control signal to be output to the motor in accordance with the phase modulation signal; and a current sensing module, a rotation-speed sensing module and/or a power sensing module, connected to the motor, the phase modulating module, and the duty cycle modulating module.

18. A motor control apparatus electrically connected to a motor, comprising:

a sensing module detecting at least one status of the motor so as to generate a sensing signal;

a duty cycle modulating module electrically connected to the sensing module for receiving the sensing signal and generating a duty cycle modulation signal in accordance with the sensing signal;

a phase modulating module electrically connected to the sensing module for receiving the sensing signal and generating a phase modulation signal in accordance with the sensing signal;

a driving module electrically connected to the duty cycle modulating module and the motor for receiving the phase modulation signal or the duty cycle modulation signal and generating a rotation-speed control signal to be output to the motor in accordance with the phase modulation signal and the duty cycle modulation signal; and a current sensing module, a rotation-speed sensing module and/or a power sensing module, connected to the motor, the phase modulating module, and the duty cycle modulating module.

* * * * *